United States Patent
Ko et al.

(10) Patent No.: US 12,065,564 B2
(45) Date of Patent: Aug. 20, 2024

(54) POLYESTER-BASED RESIN COMPOSITION AND MOLDED ARTICLE MANUFACTURED USING THE SAME

(71) Applicant: LG CHEM, LTD., Seoul (KR)

(72) Inventors: Gun Ko, Daejeon (KR); Soo Min Lee, Daejeon (KR); Yi Seul Jun, Daejeon (KR); Myeung Il Kim, Daejeon (KR); Jun Ki Park, Daejeon (KR); Jin Sol Park, Daejeon (KR); Hee Jae Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 603 days.

(21) Appl. No.: 17/285,845

(22) PCT Filed: Oct. 16, 2020

(86) PCT No.: PCT/KR2020/014131
§ 371 (c)(1),
(2) Date: Apr. 15, 2021

(87) PCT Pub. No.: WO2021/080250
PCT Pub. Date: Apr. 29, 2021

(65) Prior Publication Data
US 2022/0041859 A1    Feb. 10, 2022

(30) Foreign Application Priority Data
Oct. 24, 2019  (KR) .................. 10-2019-0132824
Nov. 28, 2019  (KR) .................. 10-2019-0155393
(Continued)

(51) Int. Cl.
B29C 45/00    (2006.01)
C08L 67/02    (2006.01)
(Continued)

(52) U.S. Cl.
CPC .......... *C08L 67/02* (2013.01); *B29C 45/0001* (2013.01); *B29C 45/0053* (2013.01);
(Continued)

(58) Field of Classification Search
CPC .................................................. B29C 45/0001
See application file for complete search history.

(56) References Cited

U.S. PATENT DOCUMENTS

2003/0035917 A1\*  2/2003  Hyman ................... B41M 5/36
                                                                   524/106
2006/0157350 A1\*  7/2006  Williamson ........... C25D 13/02
                                                                   204/471

FOREIGN PATENT DOCUMENTS

CN       107266881 A  \* 10/2017  ............... B29B 9/06
CN       109553935 A     4/2019
(Continued)

OTHER PUBLICATIONS

Irganox 1010 Data Sheet (Year: 2015).\*

*Primary Examiner* — Nahida Sultana
*Assistant Examiner* — Virak Nguon
(74) *Attorney, Agent, or Firm* — Bryan Cave Leighton Paisner LLP (57) ABSTRACT

The present disclosure relates to a polyester-based resin composition and a molded article manufactured using the same. More particularly, the present disclosure relates to a polyester-based resin composition including 93 to 99.5% by weight of a polybutylene terephthalate resin; 0.1 to 3% by weight of a polar group-containing lubricant; and 0.1 to 2% by weight of an antioxidant and a molded article manufactured using the polyester-based resin composition.

19 Claims, 3 Drawing Sheets

(30) Foreign Application Priority Data

Dec. 30, 2019 (KR) ........................ 10-2019-0178383
Oct. 13, 2020 (KR) ........................ 10-2020-0131560

(51) Int. Cl.
    *B29K 67/00*       (2006.01)
    *B29L 31/30*       (2006.01)

(52) U.S. Cl.
    CPC .. *B29C 2045/0079* (2013.01); *B29K 2067/00* (2013.01); *B29L 2031/30* (2013.01); *C08L 2201/08* (2013.01); *C08L 2205/025* (2013.01); *C08L 2205/035* (2013.01); *C08L 2205/06* (2013.01)

(56) References Cited

FOREIGN PATENT DOCUMENTS

| | | | |
|---|---|---|---|
| EP | 1298172 A1 | 4/2003 | |
| JP | 01101364 A | 4/1989 | |
| JP | 02242849 A | 9/1990 | |
| JP | 2794753 B2 | 6/1998 | |
| JP | 2011-139786 A | 5/2001 | |
| JP | 3471164 B2 | 9/2003 | |
| JP | 2005-139283 A | 6/2005 | |
| JP | 5825919 B2 | 10/2015 | |
| JP | 2017119855 A | 7/2017 | |
| JP | 2017119855 A * | 7/2017 | |
| JP | 2017155147 A | 9/2017 | |
| JP | 6334826 B2 | 5/2018 | |
| KR | 10-2004-0001572 A | 1/2004 | |
| KR | 10-2005-0025216 A | 3/2005 | |
| KR | 10-2006-0125158 A | 12/2006 | |
| KR | 10-2007-0108190 A | 11/2007 | |
| KR | 10-0853119 B1 | 8/2008 | |
| KR | 10-2011-0077686 A | 7/2011 | |
| KR | 10-2013-0068812 A | 6/2013 | |
| KR | 10-2014-0089175 A | 7/2014 | |
| KR | 10-2014-0128077 A | 11/2014 | |
| KR | 10-2015-0028216 A | 3/2015 | |
| KR | 10-2016-0083528 A | 7/2016 | |
| KR | 10-2019-0012644 A | 2/2019 | |
| KR | 10-2019-0017569 A | 2/2019 | |
| WO | 2017/038864 A1 | 3/2017 | |
| WO | 2018143078 A1 | 8/2018 | |
| WO | WO-2018143078 A1 * | 8/2018 | ............ C08K 5/098 |

* cited by examiner

POLYESTER-BASED RESIN COMPOSITION AND MOLDED ARTICLE MANUFACTURED USING THE SAME

CROSS-REFERENCE TO RELATED APPLICATIONS

This application is a National Phase entry pursuant to 35 U.S.C. § 371 of International Application No. PCT/KR2020/0014131, filed on Oct. 16, 2020, and claims priority to and the benefit of Korean Patent Application No. 10-2019-0132824, filed on Oct. 24, 2019, Korean Patent Application No. 10-2019-0155393, filed on Nov. 28, 2019, Korean Patent Application No. 10-2019-0178383, filed on Dec. 30, 2019, and Korean Patent Application No. 10-2020-0131560, filed on Oct. 13, 2020, based on the priority of the above three patents, with the Korean Intellectual Property Office, the disclosures of which are hereby incorporated by reference in their entirety for all purposes as if fully set forth herein.

TECHNICAL FIELD

The present invention relates to a polyester-based resin composition and a molded article manufactured using the same. More particularly, the present invention relates to a polyester-based resin composition having excellent fluidity, mechanical properties, thermal stability, injection stability, and surface properties and a molded article manufactured using the polyester-based resin composition. In particular, due to excellent surface properties thereof, the polyester-based resin composition does not exhibit iridescence caused by diffuse reflection. In addition, the polyester-based resin composition has a low haze value. Accordingly, the polyester-based resin composition may be used to manufacture a molded article such as an automotive headlamp bezel.

BACKGROUND ART

In general, when automotive headlamp bezels are manufactured using polyester-based resins. Automotive headlamps have different degrees of temperature rise when turned on, depending on design, bulb type, or other factors. When an automotive headlamp is heated to high temperature, an automotive headlamp bezel should be manufactured using a resin having high heat resistance.

In addition, since automotive headlamp bezels are rather large and are manufactured through high-speed injection molding, materials with low gas generation and excellent surface properties are required.

When an automotive headlamp bezel is manufactured using a conventional polyester-based resin, as a result of heat resistance evaluation after bezel deposition, fine cracks are generated on the surface of the headlamp bezel due to difference in shrinkage rates between an aluminum deposition layer and a resin layer, and iridescence caused by diffuse reflection is exhibited. Thus, the automotive headlamp bezel has a poor appearance. In addition, when a headlamp is turned on, materials that migrate from the headlamp bezel are generated due to increase in temperature. These migrated materials solidify on the inner surface of a headlamp lens, lowering the light transmittance of the headlamp.

Conventionally, in consideration of injection workability, resins having high fluidity have been used when manufacturing headlamp bezels. However, there is a problem in that the surface quality of an injection product deteriorates due to generation of gas derived from low molecular weight oligomers contained in a resin having high fluidity during injection. In addition, there is another problem in that pressure deviation occurs during injection.

Therefore, a material having excellent injection moldability, injection stability, and mechanical properties and having improved thermal stability and appearance properties needs to be developed.

DISCLOSURE

Technical Problem

Therefore, the present invention has been made to solve the above problems, and it is one object of the present invention to provide a polyester-based resin composition having excellent fluidity, mechanical properties, thermal stability, injection stability, and surface properties and a molded article manufactured using the same. In particular, due to excellent surface properties thereof, the polyester-based resin composition does not exhibit iridescence caused by diffuse reflection. In addition, the polyester-based resin composition has a low haze value. Accordingly, the polyester-based resin composition can be used to manufacture a molded article such as an automotive headlamp bezel.

It is another object of the present invention to provide a polyester-based resin composition used for making an automotive headlamp bezel having a low haze value and excellent mechanical properties and an automotive headlamp bezel manufactured using the same.

However, problems to be solved by the present invention are not limited to the above-described problems, and other problems that are not mentioned will be clearly understood by those skilled in the art from the following description.

The above and other objects can be accomplished by the present disclosure described below.

Technical Solution

In accordance with one aspect of the present invention, provided is a polyester-based resin composition including 93 to 99.5% by weight of a polybutylene terephthalate resin; 0.1 to 3% by weight of a polar group-containing lubricant; and 0.1 to 2% by weight of an antioxidant.

Preferably, the polybutylene terephthalate resin can have an intrinsic viscosity of 0.90 to 1.15 dl/g.

In the present invention, intrinsic viscosity can be measured using a Canon viscometer after completely dissolving 2 g of a polybutylene terephthalate resin in 25 ml of 2-chlorophenol.

Preferably, the polybutylene terephthalate resin can include a first polybutylene terephthalate resin having a relative viscosity of 0.95 to 1 as measured according to ASTM D1243 and a second polybutylene terephthalate resin having a relative viscosity of 0.75 to 0.8 as measured according to ASTM D1243.

Preferably, the polar group-containing lubricant can be a lubricant containing at least one polar group of a hydroxyl group, a carbonyl group, and an amino group.

Preferably, the polar group-containing lubricant can have a dropping point of 115 to 128° C. or a crystallization temperature (Tm) of 102 to 122° C.

In the present invention, dropping point indicates the minimum temperature at which a lubricant is transformed to a liquid when raising temperature according to ASTM D566, KS M 2033. More specifically, a sample is placed in a specified cup having a diameter of 100 mm and the sample is heated according to the specified conditions. Then, a temperature at which grease drops is measured. In this case, the temperature represents a dropping point.

In the present invention, crystallization temperature refers to a temperature at which crystallization occurs. In this case, crystallization means that the structure of a substance is converted from an irregular arrangement into a regular arrangement by attraction between molecules/atoms, and crystallization temperature can be measured using a differential scanning calorimeter (DSC). As a specific example of crystallization temperature measurement, a measurement container is filled with approximately 0.5 mg to 10 mg of a sample, and the flow rate of nitrogen gas is set to 20 ml/min. To make the thermal history of the sample the same, temperature is raised from 0° C. to 150° C. at a rate of 20° C./min, and then maintained for 2 minutes in that state. Then, heat flow is measured using a DSC while cooling from 150° C. to −100° C. at a rate of 10° C./min. At this time, the peak of the cooling curve of heat flow, i.e., the temperature of an exothermic peak during cooling, is crystallization temperature. At this case, "peak" means a vertex of the cooling curve or a heating curve to be described later. For example, based on a point where the slope of a tangent line is 0, inflection points where the sign of the slope value of the tangent line changes are excluded.

Preferably, the polar group-containing lubricant can be a lubricant containing two or more polar groups at the terminal thereof, more preferably a lubricant containing two to five polar groups at the terminal thereof.

Preferably, the antioxidant can be a phenolic antioxidant.

Preferably, the polyester-based resin composition can further include a hydrolysis stabilizer.

Preferably, the hydrolysis stabilizer can be included in an amount of 0.01 to 2% by weight.

Preferably, the hydrolysis stabilizer can be an aromatic group-containing polycarbodiimide-based compound.

Preferably, the polyester-based resin composition can further include a styrene-acrylonitrile copolymer.

Preferably, the styrene-acrylonitrile copolymer can be included in an amount of 0.5 to 6% by weight.

Preferably, the styrene-acrylonitrile copolymer can be a copolymer including 71 to 75% by weight of styrene and 25 to 29% by weight of acrylonitrile.

Preferably, the polyester-based resin composition can have a haze value of 10 or less.

In accordance with another aspect of the present invention, provided is a molded article manufactured by extruding or injecting the polyester-based resin composition.

In this case, extruding can be performed by adding the components of the polyester-based resin composition into a super mixer, homogenizing the components, melting and kneading the mixture using a twin-screw extruder at 240 to 270° C., and performing extrusion to prepare a pellet.

Preferably, the molded article can be an automotive headlamp bezel.

Preferably, the molded article can have a haze value of 10 or less, more preferably 5 or less, at 130 to 160° C.

In accordance with still another aspect of the present invention, provided is a polyester-based resin composition including a polybutylene terephthalate resin; a polar group-containing lubricant; an antioxidant; and a hydrolysis stabilizer.

In accordance with still another aspect of the present invention, provided is a polyester-based resin composition including a polybutylene terephthalate having an intrinsic viscosity of 0.90 to 1.15 dl/g; an ester group-containing lubricant; an antioxidant; and a hydrolysis stabilizer.

In accordance with still another aspect of the present invention, provided is a composition for automotive headlamp bezels, the composition including a polybutylene terephthalate resin and a styrene-acrylonitrile copolymer, wherein the styrene-acrylonitrile copolymer includes 25 to 29% by weight of acrylonitrile.

In accordance with yet another aspect of the present invention, provided is a method of manufacturing an automotive headlamp bezel, the method including an injection step of injecting the polyester-based resin composition to manufacture a molded article; a painting step of painting the manufactured molded article; and a deposition step of depositing aluminum on the painted molded article.

Preferably, the injecting step can be performed under conditions of an injection temperature of 240 to 270° C. and a mold temperature of 100 to 120° C.

Advantageous Effects

According to the present invention, a polyester-based resin composition having excellent fluidity, mechanical properties, thermal stability, injection stability, and surface properties and a molded article manufactured using the same can be provided. In particular, due to excellent surface properties thereof, the polyester-based resin composition does not exhibit iridescence caused by diffuse reflection. In addition, the polyester-based resin composition has a low haze value. Accordingly, the polyester-based resin composition can be used to manufacture a molded article such as an automotive headlamp bezel.

The effects of the present invention are not limited to the above-described effects, and effects that are not mentioned will be clearly understood by those skilled in the art through the specification and the accompanying drawings.

BEST MODE

In the present invention, it is to be understood that, unless otherwise stated, when a part "comprises" any element, the part can include other elements without excluding other elements.

In the present invention, when a member is located "on" the other member, this includes not only the case where the member is in contact with the other member but also the case where another member is present between the two members.

Throughout this specification, a unit "part by weight" may mean a weight ratio between components.

Hereinafter, the present invention will be described in detail.

According to one embodiment of the present invention, a polyester-based resin composition including a polybutylene terephthalate resin; a polar group-containing lubricant; an antioxidant; and a hydrolysis stabilizer is provided. In this case, the polyester-based resin composition can have excellent mechanical properties and thermal stability.

According to another embodiment of the present invention, a polyester-based resin composition including a polybutylene terephthalate having an intrinsic viscosity of 0.90 dl/g to 1.15 dl/g; an ester group-containing lubricant; an antioxidant; and a hydrolysis stabilizer is provided. In this case, the polyester-based resin composition can have excellent mechanical properties and injection stability.

According to another embodiment of the present invention, a composition for automotive headlamp bezels including a polybutylene terephthalate resin and a styrene-acrylonitrile copolymer, wherein the styrene-acrylonitrile copolymer includes 25 to 29% by weight of acrylonitrile, is provided. In this case, the composition for automotive headlamp bezels can have excellent fluidity, mechanical properties, and injection stability, can have a low haze value, and may not exhibit iridescence. Thus, the composition for automotive headlamp bezels can be suitably used in manufacture of an automotive headlamp bezel.

According to another embodiment of the present invention, a polyester-based resin composition including 93 to 99.5% by weight of a polybutylene terephthalate resin; 0.1 to 3% by weight of a polar group-containing lubricant; and 0.1 to 2% by weight of an antioxidant is provided. In this case, the polyester-based resin composition can have excellent mechanical properties, thermal stability, surface properties, and injection stability, can have a low haze value, and may not exhibit iridescence. Thus, the polyester-based resin composition can be suitably used in manufacture of an automotive headlamp bezel.

According to one embodiment of the present invention, the polybutylene terephthalate can have an intrinsic viscosity of 0.90 dl/g to 1.15 dl/g. Specifically, the polybutylene terephthalate can have an intrinsic viscosity of 0.91 dl/g to 1.14 dl/g, 0.91 dl/g to 1.12 dl/g, 0.93 dl/g to 1.10 dl/g, 0.95 dl/g to 1.08 dl/g, 0.97 dl/g to 1.05 dl/g, or 1.00 dl/g to 1.03 dl/g.

More specifically, the polybutylene terephthalate can have an intrinsic viscosity of 0.90 dl/g to 0.95 dl/g, 0.96 dl/g to 0.99 dl/g, 1.01 dl/g to 1.06 dl/g, 1.08 dl/g to 1.12 dl/g, or 1.13 dl/g to 1.15 dl/g.

A polyester-based resin composition including a polybutylene terephthalate having an intrinsic viscosity within the above-described range can have excellent mechanical properties and injection stability. In addition, by using a polybutylene terephthalate having an intrinsic viscosity within the above range, a polyester-based resin composition having good fluidity and excellent surface quality can be provided.

According to one embodiment of the present invention, based on 100 parts by weight of the polyester-based resin composition, the polybutylene terephthalate resin can be included in an amount of 95 parts by weight to 99.5 parts by weight. Specifically, based on 100 parts by weight of the polyester-based resin composition, the polybutylene terephthalate resin can be included in an amount of 97 parts by weight to 99.5 parts by weight, 95 parts by weight to 98 parts by weight, or 99 parts by weight to 99.5 parts by weight. By adjusting the content of the polybutylene terephthalate resin included in the polyester-based resin composition within the above-described range, a polyester-based composition having excellent mechanical properties can be provided. In addition, a molded article manufactured using the polyester-based resin composition can have excellent surface properties.

According to one embodiment of the present invention, the polybutylene terephthalate resin can include two or more polybutylene terephthalate resins each having different viscosity. Specifically, the polybutylene terephthalate resin can include a first polybutylene terephthalate resin having a relative viscosity of 0.95 to 1 as measured according to ASTM D1243 and a second polybutylene terephthalate resin having a relative viscosity of 0.75 to 0.8 as measured according to ASTM D1243. When the first and second polybutylene terephthalate resins are included within the above-described ranges, a polyester-based resin composition having excellent mechanical properties can be provided.

Relative viscosity can be measured according to ASTM D1243. Specifically, a polybutylene terephthalate resin can be dissolved in any one solvent of a mixed solution of phenol and 1,2-dichlorobenzene; o-chlorophenol; a mixed solution of phenol and 1,1,2,2-tetrachloroethane; and m-cresol, and then the relative viscosity of the dissolved resin can be measured.

According to one embodiment of the present invention, the first polybutylene terephthalate resin and the second polybutylene terephthalate resin can be included in a weight ratio of 2:1 to 1:2. When the first and second polybutylene terephthalate resins are included in a weight ratio within this range, a molded article manufactured using the composition for automotive headlamp bezels can have excellent surface properties.

According to one embodiment of the present invention, based on 100 parts by weight of the first polybutylene terephthalate resin, the second polybutylene terephthalate resin can be included in an amount of 60 to 80 parts by weight or 69 to 77 parts by weight.

According to one embodiment of the present invention, based on 100 parts by weight of the polyester-based resin composition, the polar group-containing lubricant can be included in an amount of 0.1 parts by weight to 3 parts by weight. Specifically, based on 100 parts by weight of the polyester-based resin composition, the polar group-containing lubricant can be included in an amount of 0.2 parts by weight to 2.5 parts by weight, 0.4 parts by weight to 2 parts by weight, 0.2 parts by weight to 1 part by weight, 1.5 parts by weight to 2.2 parts by weight, or 2 parts by weight to 3 parts by weight. By adjusting the content of the lubricant included in the polyester-based resin composition within the above-described range, the polyester-based resin composition can have excellent thermal stability, and due to the low volatility thereof, gas generation can be prevented during molding. In addition, the polyester-based resin composition can have excellent processability and moldability.

According to another embodiment of the present invention, based on 100 parts by weight of the polyester-based resin composition, the ester group-containing lubricant can be included in an amount of greater than 0 parts by weight and less than or equal to 1 part by weight, preferably 0.1 parts by weight to 1 part by weight. Specifically, based on 100 parts by weight of the polyester-based resin composition, the ester group-containing lubricant can be included in an amount of 0.2 parts by weight to 0.8 parts by weight, or 0.3 parts by weight to 0.6 parts by weight. More specifically, based on 100 parts by weight of the polyester-based resin composition, the ester group-containing lubricant can be included in an amount of 0.1 parts by weight to 0.3 parts by weight, 0.2 parts by weight to 0.5 parts by weight, or 0.6 parts by weight to 1 part by weight. By adjusting the content of the lubricant included in the polyester-based resin composition within the above-described range, the polyester-based resin composition can have excellent injection stability, and due to the low volatility thereof, gas generation can be prevented during molding. In addition, the polyester-based resin composition can have excellent processability and moldability.

According to one embodiment of the present invention, the polar group-containing lubricant can include a polyolefin containing at least one polar group of a hydroxyl group, a carbonyl group, and an amino group. Specifically, the carbonyl group can be a carboxyl group or an ester group. Specifically, the polar group-containing lubricant preferably includes a hydroxyl group. By using the lubricant containing the above-described polar group, the thermal stability of the polyester-based resin composition can be efficiently improved without deterioration in the physical properties thereof.

For example, the lubricant can be prepared by polymerizing olefins having 1 to 5 carbon atoms. Specifically, the lubricant can be a polymer consisting of monomers including olefins containing at least the polar group and 1 to 5 carbon atoms. The lubricant including a polymer of olefins containing a polar group and 1 to 5 carbon atoms has excellent thermal stability and low volatility, and thus a polyester-based resin composition including the lubricant can have excellent thermal stability and moldability.

According to one embodiment of the present invention, the lubricant can include an ester group. By using an ester group-containing lubricant, the polyester-based resin composition can have good fluidity, thereby improving the processability and moldability thereof. In addition, since the lubricant containing an ester group has low volatility, gas generation can be prevented during injection molding of a polyester-based resin composition including the lubricant.

According to one embodiment of the present invention, the lubricant can include pentaerythritol-based lubricants. For example, the lubricant can include pentaerythritol monoester compounds such as pentaerythritol monostearate, pentaerythritol distearate, and pentaerythritol tetrastearate or pentaerythritol diester compounds.

According to one embodiment of the present invention, the weight ratio of the lubricant to the polybutylene terephthalate resin can be 1:40 to 1:250. Specifically, the weight ratio of the lubricant to the polybutylene terephthalate resin can be 1:45 to 1:250, 1:40 to 1:50, or 1:200 to 1:250. By adjusting the weight ratio of the lubricant to the polybutylene terephthalate resin within the above-described range, a polyester-based resin composition having excellent mechanical properties and thermal stability can be provided. In addition, the polyester-based resin composition can have excellent processability and moldability.

According to another embodiment of the present invention, the weight ratio of the lubricant to the polybutylene terephthalate can be 1:250 to 1:350. Specifically, the weight ratio of the lubricant to the polybutylene terephthalate can be 1:270 to 1:340, 1:285 to 1:330, 1:290 to 1:320, or 1:300 to 1:310. More specifically, the weight ratio of the lubricant to the polybutylene terephthalate can be 1:250 to 1:280, 1:290 to 1:330, 1:300 to 1:330, 1:315 to 1:330, or 1:320 to 1:350.

By adjusting the weight ratio of the lubricant to the polybutylene terephthalate within the above-described range, a polyester-based resin composition having excellent mechanical properties and injection stability can be provided. In addition, the polyester-based resin composition can have excellent processability and surface quality.

According to one embodiment of the present invention, based on 100 parts by weight of the polyester-based resin composition, the antioxidant can be included in an amount of greater than 0 parts by weight and less than or equal to 1 part by weight, preferably 0.1 parts by weight to 1 part by weight. Specifically, based on 100 parts by weight of the polyester-based resin composition, the antioxidant can be included in an amount of 0.2 parts by weight to 0.7 parts by weight, 0.2 parts by weight to 0.5 parts by weight, or 0.1 parts by weight to 0.3 parts by weight. When the antioxidant is included in the polyester-based resin composition within this content range, the polyester-based resin composition can be prevented from discoloring. In addition, by adjusting the content of the antioxidant within the above-described range, cleavage or crosslinking of the molecular chains of polymers included in the polyester-based resin composition due to oxidation can be suppressed, thereby preventing degradation of physical properties.

According to another embodiment of the present invention, based on 100 parts by weight of the polyester-based resin composition, the antioxidant can be included in an amount of 0.1 to 0.5 parts by weight.

Specifically, based on 100 parts by weight of the polyester-based resin composition, the antioxidant can be included in an amount of 0.2 to 0.7 parts by weight, 0.2 to 0.5 parts by weight, or 0.1 to 0.3 parts by weight. When the antioxidant is included in the polyester-based resin composition within this content range, the polyester-based resin composition can be prevented from discoloring. In addition, by adjusting the content of the antioxidant within the above-described range, cleavage or crosslinking of the molecular chains of polymers included in the polyester-based resin composition due to oxidation can be suppressed, thereby preventing degradation of physical properties.

According to one embodiment of the present invention, the antioxidant can include a phenolic antioxidant. By using the phenolic antioxidant, polymers included in the polyester-based composition can be further stabilized. Specifically, the phenolic antioxidant can serve to protect the polyester-based composition by removing the radicals of polymers included in the polyester-based resin composition during molding of the polyester-based resin composition.

The phenolic antioxidant preferably includes one or more selected from tetrakis[ethylene-3-(3,5-di-t-butyl-hydroxy phenyl)propionate] (IR-1010), octadecyl 3-(3,5-di-t-butyl-4-hydroxyphenyl)propionate (IR-1076), pentaerythritol tetrakis[3-(3,5-di-t-butyl-4-hydroxyphenyl)propionate], and 1,3,5-trimethyl-2,4,6-tris(3,5-di-t-butyl-4-hydroxybenzyl) benzene. More preferably, the phenolic antioxidant is octadecyl 3-(3,5-di-t-butyl-4-hydroxyphenyl)propionate (IR-1076), still more preferably Hindered Phenolic Antioxidant 1010.

According to one embodiment of the present invention, based on 100 parts by weight of the polyester-based resin composition, the hydrolysis stabilizer can be included in an amount of 0.01 parts by weight to 0.5 parts by weight. Specifically, based on 100 parts by weight of the polyester-based resin composition, the hydrolysis stabilizer can be included in an amount of 0.01 parts by weight to 0.2 parts by weight, 0.02 parts by weight to 0.15 parts by weight, 0.04 parts by weight to 0.1 parts by weight, 0.01 parts by weight to 0.07 parts by weight, or 0.05 parts by weight to 0.12 parts by weight. By adjusting the content of the hydrolysis stabilizer included in the polyester-based resin composition within the above-described range, the hydrolysis resistance of the polyester-based resin composition can be effectively improved. Thereby, volatile gas components generated from the polyester-based resin composition can be reduced, and deterioration in fluidity during injecting can be prevented.

According to another embodiment of the present invention, based on 100 parts by weight of the polyester-based resin composition, the hydrolysis stabilizer can be included in an amount of greater than 0 parts by weight and less than or equal to 1 part by weight, preferably 0.1 parts by weight to 1 part by weight. Specifically, based on 100 parts by weight of the polyester-based resin composition, the hydrolysis stabilizer can be included in an amount of 0.2 parts by weight to 0.8 parts by weight, 0.3 parts by weight to 0.7 parts by weight, or 0.4 parts by weight to 0.6 parts by weight. By adjusting the content of the hydrolysis stabilizer included in the polyester-based resin composition within the above-described range, the hydrolysis resistance of the polyester-based resin composition can be effectively improved. Thereby, volatile gas components generated from the polyester-based resin composition can be reduced, and deterioration in fluidity during injecting can be prevented.

According to one embodiment of the present invention, the hydrolysis stabilizer can include aromatic group-containing polycarbodiimide-based compounds. Specifically, the hydrolysis stabilizer can include phenyl group-containing polycarbodiimides. When an aromatic group-containing polycarbodiimide-based compound is used as the hydrolysis stabilizer, gas generation during molding of the polyester-based resin composition can be effectively prevented.

For example, the aromatic group-containing polycarbodiimide-based compound can be a homopolymer or copolymer consisting of one or more aromatic carbodiimide compounds. As a specific example, the aromatic group-containing polycarbodiimide compound can include a compound represented by Chemical Formula 1 below. In this case, the polyester-based resin composition can have excellent mechanical properties and hydrolysis resistance, and the polyester-based resin composition can be suitably used for manufacture of automotive headlamp bezels.

[Chemical Formula 1]

In Chemical Formula 1, n is an integer of 1 to 20.

For example, the aromatic group-containing polycarbodiimide-based compound represented by Chemical Formula 1 can be prepared according to Reaction Formula 1 below.

[Reaction Formula 1]

In Reaction Formula 1, DIPPI and TRIDI are carbodiimide compounds as precursors, +T means heating to a predetermined reaction temperature, and $-CO_2$ means that $CO_2$ is removed from the precursors during reaction.

For example, the aromatic carbodiimide compound can include one or more selected from the group consisting of N,N'-di-o-tolylcarbodiimide, N,N'-di-2,6-diketylphenylcarbodiimide, N-tolyl-N'-cyclohexylcarbodiimide, N,N'-di-2,6-diisopropylphenylcarbodiimide, N,N'-di-2,6-di-tertiary-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-p-tolylcarbodiimide, p-propylene-bis-di-o-tolylcarbodiimide, p-propylene-bisdicyclohexylcarbodiimide, ethylene-bisdiphenylcarbodiimide, benzene-2,4-diisocyanato-1,3,5-tris(1-methylethyl), and 2,4-diisocyanato-1,3,5-tris(1-methylethyl).

As another example, the aromatic group-containing polycarbodiimide-based compound can include one or more selected from the group consisting of a benzene-2,4-diisocyanato-1,3,5-tris(1-methylethyl) homopolymer; and a copolymer of 2,4-diisocyanato-1,3,5-tris(1-methylethyl) and 2,6-diisopropyl diisocyanate.

For example, the aromatic group-containing polycarbodiimide-based compound can have a weight average molecular weight of 500 to 4,000 g/mol or 1,000 to 3,500 g/mol. Within this range, mechanical properties can be excellent.

In this description, unless otherwise defined herein, weight average molecular weight can be measured using gel permeation chromatography (GPC, Waters Breeze). As a specific example, weight average molecular weight can be measured using tetrahydrofuran (THF) as an eluate through gel permeation chromatography (GPC, Waters Breeze). In this case, weight average molecular weight is obtained as a relative value to a standard polystyrene (PS) specimen.

According to one embodiment of the present invention, based on 100 parts by weight of the polybutylene terephthalate resin, the total weight of the lubricant, the antioxidant, and the hydrolysis stabilizer as additives can be greater than 0 parts by weight and less than or equal to 3 parts by weight, or 0.1 parts by weight to 3 parts by weight.

According to one embodiment of the present invention, the styrene-acrylonitrile copolymer can include 25 to 29% by weight, 26 to 29% by weight, or 28 to 29% by weight of acrylonitrile. When the styrene-acrylonitrile copolymer including acrylonitrile within this content range is used, the composition for automotive headlamp bezels can have excellent mold shrinkage, and thus the release properties thereof can be improved. This effect can be clearly confirmed especially when a molded article is relatively large.

According to one embodiment of the present invention, based on 100 parts by weight of the polybutylene terephthalate resin, the styrene-acrylonitrile copolymer can be included in an amount of 1 to 15 parts by weight, 3 to 10 parts by weight, or 5 to 10 parts by weight. Within this range, the composition for automotive headlamp bezels can have excellent injection moldability.

According to one embodiment of the present invention, based on the total weight of the composition for automotive headlamp bezels, the styrene-acrylonitrile copolymer can be included in an amount of 1 to 10% by weight or 1 to 5% by weight.

The composition for automotive headlamp bezels according to one embodiment of the present invention can include a polyethylene terephthalate resin. When the polyethylene terephthalate resin is added, appearance can be further improved. However, due to the low polymer crystallization rate of the polyethylene terephthalate resin, moldability can deteriorate. Thus, based on the total weight of the composition for automotive headlamp bezels, the polyethylene terephthalate resin is preferably included in an amount of 1 to 10% by weight.

According to one embodiment of the present invention, the composition for automotive headlamp bezels can have a haze value of 10 or less, 8 or less, 7 or less, or 6 or less. Within this range, from a lamp light source, projection ability in the front direction can be excellent.

According to one embodiment of the present invention, a bezel for lamps including a molded article manufactured using a polyester-based resin composition is provided. The bezel for lamps can have excellent thermal stability.

A polyester-based resin composition used to form a bezel for lamps according to one embodiment of the present invention can be the same as the polyester-based resin composition according to one embodiment described above. That is, according to one embodiment of the present invention, a bezel for lamps including a molded article manufactured using a polyester-based resin composition including a polybutylene terephthalate resin; a polar group-containing lubricant; an antioxidant; and a hydrolysis stabilizer is provided.

In addition, a polyester-based resin composition used to form a bezel for lamps according to another embodiment of the present invention can be the same as the polyester-based resin composition according to one embodiment described above. That is, according to one embodiment of the present invention, a bezel for lamps including a molded article manufactured using a polyester-based resin composition including a polybutylene terephthalate having an intrinsic viscosity of 0.90 dl/g to 1.15 dl/g; an ester group-containing lubricant; an antioxidant; and a hydrolysis stabilizer is provided.

According to one embodiment of the present invention, the bezel for lamps can include an injection-molded product or an extrusion-molded product manufactured using the polyester-based resin composition. That is, the bezel for lamps can be formed by injection molding or extrusion molding the polyester-based resin composition. By using a method commonly used in the art without limitation, the polyester-based resin composition can be injection-molded or extrusion-molded.

According to one embodiment of the present invention, the bezel for lamps may not exhibit whitening at a temperature of 130° C. to 160° C. As described above, in the case of the bezel for lamps including a molded article manufactured using the polyester-based resin composition having excellent thermal stability, occurrence of whitening due to surface migration at high temperature can be suppressed. In addition, the bezel for lamps can have excellent mechanical properties and surface quality. In addition, the bezel for lamps can have a low haze value and excellent surface properties such as paintability and evaporation properties.

According to one embodiment of the present invention, the bezel for lamps can be an automotive headlamp bezel. As described above, since the bezel for lamps has excellent thermal stability, surface properties, and mechanical properties, excellent surface properties such as paintability and evaporation properties, and a low haze value, the bezel for lamps can be used as an automotive headlamp bezel.

The automotive headlamp bezel according to another embodiment of the present invention can be manufactured by depositing metal such as aluminum on the surface of a molded article manufactured using a composition for automotive headlamp bezels. As a specific example, the automotive headlamp bezel can be manufactured through injection, painting, and aluminum deposition processes.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications can be made without departing from the spirit and scope of the present invention, and such changes and modifications are also within the scope of the appended claims.

EXAMPLES

Preparation of Polyester-Based Resin Composition

Example 1

A polybutylene terephthalate resin, carbonyl group-containing polyethylene wax having a dropping point of approximately 123° C. or less and a crystallization temperature (Tm) of approximately 121° C. as a polar group-containing lubricant, a phenolic antioxidant as an antioxidant, and a phenyl group-containing polycarbodiimide as a hydrolysis stabilizer were mixed to prepare a polyester-based resin composition.

In this case, based on 100 parts by weight of the polyester-based resin composition, the content of the polybutylene terephthalate resin was 99.2 parts by weight, the content of the polar group-containing lubricant was 0.1 parts by weight, the content of the antioxidant was 0.2 parts by weight, and the content of the hydrolysis stabilizer was 0.5 parts by weight.

Examples 2 to 5

A polyester-based resin composition was prepared in the same manner as in Example 1, except that the contents of each of the polybutylene terephthalate resin, the polar group-containing lubricant, the antioxidant, and the hydrolysis stabilizer were adjusted as shown in Table 1 below.

Additional Example 1

A polyester-based resin composition was prepared in the same manner as in Example 1, except that a montanic acid ester having a dropping point of approximately 74° C. or less and a crystallization temperature (Tm) of approximately ° C. was used instead of the polar group-containing lubricant used in Example 1 and the contents of each of the polybutylene terephthalate resin, the montanic acid ester, the antioxidant, and the hydrolysis stabilizer were adjusted as shown in Table 1 below.

Additional Example 2

A polyester-based resin composition was prepared in the same manner as in Example 1, except that pentaerythritol tetrastearate having a dropping point of approximately 60° C. to 63° C. and a crystallization temperature (Tm) of approximately 59° C. was used instead of the polar group-containing lubricant used in Example 1 and the contents of each of the polybutylene terephthalate resin, pentaerythritol tetrastearate, the antioxidant, and the hydrolysis stabilizer were adjusted as shown in Table 1 below.

Additional Example 3

A polyester-based resin composition was prepared in the same manner as in Additional Example 1, except that the contents of each of the polybutylene terephthalate resin, a montanic acid ester having a dropping point of approximately 74° C. or less and a crystallization temperature (Tm) of approximately 66° C., the antioxidant, and the hydrolysis stabilizer were adjusted as shown in Table 1 below.

Additional Example 4

A polyester-based resin composition was prepared in the same manner as in Example 1, except that a partially saponified montanic acid ester having a dropping point of approximately 105° C. or less and a crystallization temperature (Tm) of approximately 81° C. was used instead of the polar group-containing lubricant used in Example 1 and the contents of each of the polybutylene terephthalate resin, the partially saponified montanic acid ester, the antioxidant, and the hydrolysis stabilizer were adjusted as shown in Table 1 below.

Comparative Example 1

A polyester-based resin composition was prepared in the same manner as in Example 1, except that polar group-free polyethylene wax having a dropping point of approximately 135° C. or less and a crystallization temperature (Tm) of approximately 124° C. was used instead of the polar group-containing lubricant used in Example 1 and the contents of each of the polybutylene terephthalate resin, the polar group-free polyethylene wax, the antioxidant, and the hydrolysis stabilizer were adjusted as shown in Table 1 below.

TABLE 1

| Parts by weight | Examples | | | | | Additional Examples | | | | Comparative Example |
| --- | --- | --- | --- | --- | --- | --- | --- | --- | --- | --- |
| | 1 | 2 | 3 | 4 | 5 | 1 | 2 | 3 | 4 | 1 |
| A | 99.2 | 99.1 | 98.9 | 98.5 | 98.3 | 99.1 | 99.1 | 99.1 | 99.1 | 99.1 |
| B1 | | | | | | | 0.2 | | | |
| B2 | | | | | | 0.2 | | 0.4 | | |
| B3 | | | | | | | | | 0.2 | |
| B4 | 0.1 | 0.2 | 0.8 | 1.0 | 2.0 | | | | | |
| B5 | | | | | | | | | | 0.2 |
| C | 0.2 | 0.2 | 0.2 | 0.2 | 0.2 | 0.2 | 0.2 | 0.2 | 0.2 | 0.2 |
| D | 0.5 | 0.5 | 0.5 | 0.5 | 0.5 | 0.5 | 0.5 | 0.5 | 0.5 | 0.5 |

In Table 1, "A" represents the polybutylene terephthalate resin, "B1" represents pentaerythritol tetrastearate, "B2" represents the montanic acid ester, "B3" represents the partially saponified montanic acid ester, "B4" represents the carbonyl group-containing polyethylene wax, "B5" represents the polar group-free polyethylene wax, "C" represents the phenolic antioxidant, and "D" represents the phenyl group-containing polycarbodiimide. In addition, in Table 1, the content of each component is given in parts by weight based on 100 parts by weight of the polyester-based resin composition.

Preparation of Specimens for Measuring Physical Properties

Each of polyester-based resin compositions according to Examples 1 to 5, Additional Examples 1 to 4, and Comparative Example 1 formulated according to the components and contents specified in Table 1 was added to a super mixer and homogenized, was melted and kneaded using a twin-screw extruder at a temperature range of 240 to 270° C., and then was extruded to obtain pellets. Thereafter, the obtained pellets were dried at 120° C. for 4 hours or more and injected using an 80-ton injection machine at the same temperature range and at a mold temperature of 100 to 120° C. to prepare a specimen for measuring physical properties. The physical properties of the prepared polyester-based resin composition specimen were measured using the following methods, and the results are shown in Table 2.

Fluidity (Flow Index)

Fluidity was measured at 250° C. under a load of 2.16 kg according to ASTM D1238.

Tensile Strength and Elongation

For a specimen having a thickness of ⅛ inch, the tensile strength and elongation thereof were measured at a tension speed of 5 mm/minutes according to ASTM D638.

Flexural Strength and Flexural Modulus

For a specimen having a thickness of ¼ inch, the flexural strength and flexural modulus thereof were measured under conditions of a span of 100 mm and a tension speed of 5 mm/min according to ASTM D790.

Viscosity Measurement and Calculation of Viscosity Change Rate

Figure 3:
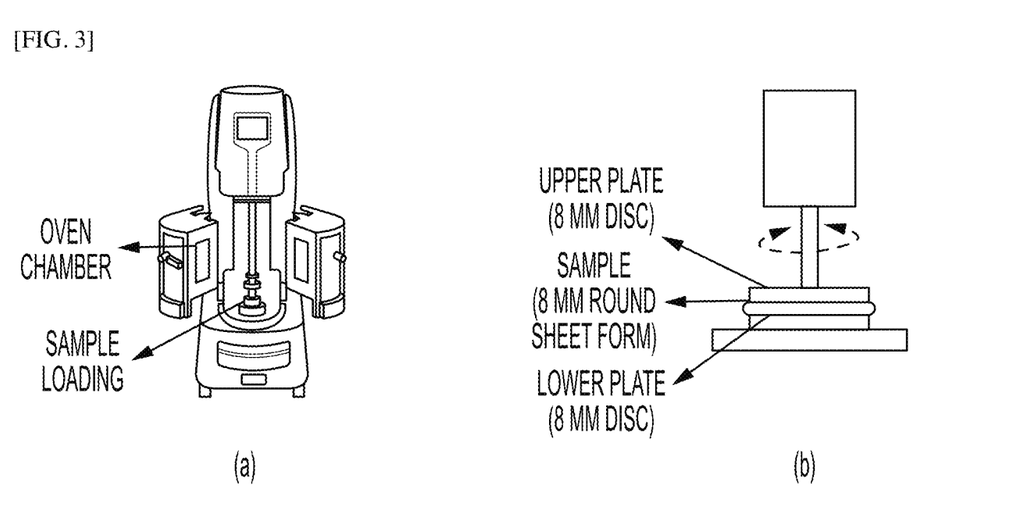
FIG. 3 shows a Discovery Hybrid Rheometer (DHR) for measuring the viscosity of a polyester-based resin composition according to one embodiment of the present invention.

FIG. 3 shows a Discovery Hybrid Rheometer (DHR) for measuring the viscosity of a polyester-based resin composition according to one embodiment of the present invention. Specifically, FIG. 3A shows an image of a DHR, and FIG. 3B is a drawing for explaining a method of measuring the viscosity of specimen using the DHR. Using the Discovery Hybrid Rheometer (DHR) shown in FIG. 3, the viscosity of the polyester-based resin compositions prepared in Examples and Comparative Examples was measured. At this time, as measurement conditions, a strain of 0.1% and a frequency of 1 Hz were set, and the viscosity of the polyester-based resin compositions was measured at 250° C. and 270° C., respectively. In addition, viscosity change rate was calculated according to Equation 1 below.

Viscosity change rate (%)=100×{1−(viscosity at 270° C./viscosity at 250° C.)}  [Equation 1]

Fluidity Evaluation (Spiral Flow Length Measurement)

Figure 2:
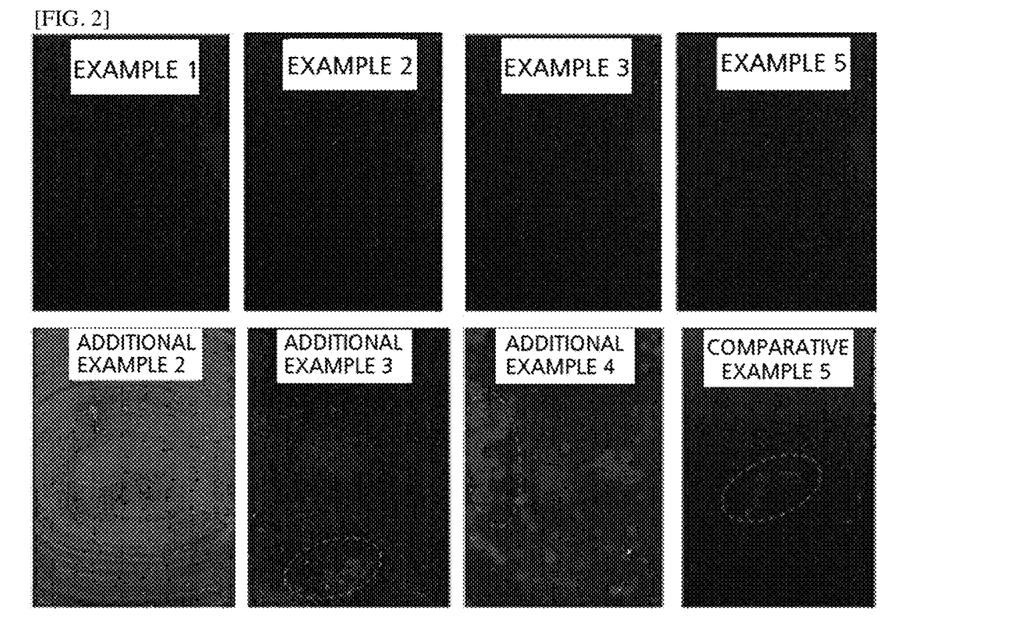
FIG. 2 shows the results of a whitening test performed on the specimens of Examples 1 to 3 and Example 5 and Additional Examples 2 to 4, and comparative example 1 according to the present invention.
Figure 4:
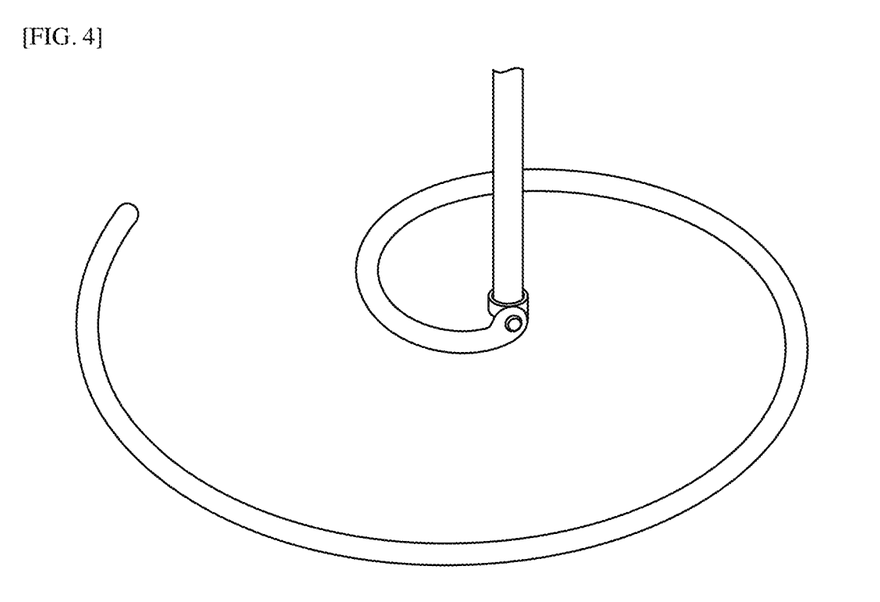
FIG. 4 is an image of a specimen when the spiral flow length of a polyester-based resin composition according to one embodiment of the present invention is measured.

FIG. 4 is an image of a specimen when the spiral flow length of a polyester-based resin composition according to one embodiment of the present invention is measured. When measuring spiral flow length, a 120-ton injection machine was used, and injection pressure was set to 60 bar, cylinder temperature was set to 250° C., and mold temperature was set to 50° C. After the 15th shot, the length (cm) of a polyester-based resin composition injected from a spiral mold as shown in FIG. 2 was measured. Spiral flow lengths were measured in the same manner as above at injection pressures of 90 bar and 120 bar, respectively. In addition, the maximum injection pressure of the polyester-based resin composition was measured.

Heat Resistance Migration (Whitening)

A specimen having a size of 10 mm (width)×10 mm (length)×3 mm (thickness) was allowed to stand in a gear oven at 130° C. for 20 hours, and then the degree of whitening of the surface of the specimen was evaluated. At this time, when there is no whitening, it was marked with "None". When whitening was visually observed, it was marked with "X". When slight whitening was observed, it was marked with "XX". When obvious whitening was observed, it was marked with "XXX". The degree of whitening of a specimen was evaluated at 160° C. and 200° C. in the same manner as above, respectively.

Mold Deposit (Gas Generation)

Figure 1:
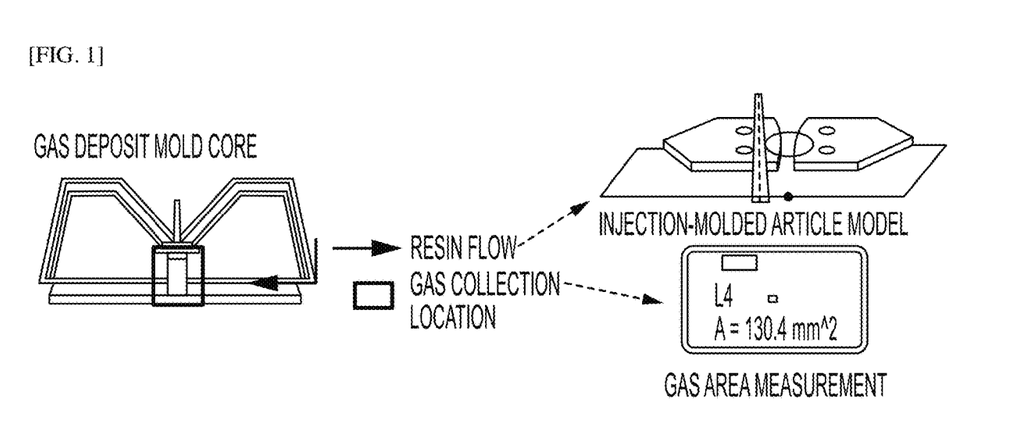
FIG. 1 includes drawings for explaining a method of evaluating the amount of gas generated when molding a polyester-based resin composition according to one embodiment of the present invention.

FIG. 1 includes drawings for explaining a method of evaluating the amount of gas generated when molding a polyester-based resin composition according to one embodiment of the present invention. Using the mold shown in FIG. 1, a polyester-based resin composition was injected at 250° C. to prepare an injection-molded article. At this time, the area of gas collected at a gas collection location was measured. The degree of gas generation in a polyester-based resin composition was evaluated at 270° C. in the same manner as above.

Haze Evaluation

Figure 5:
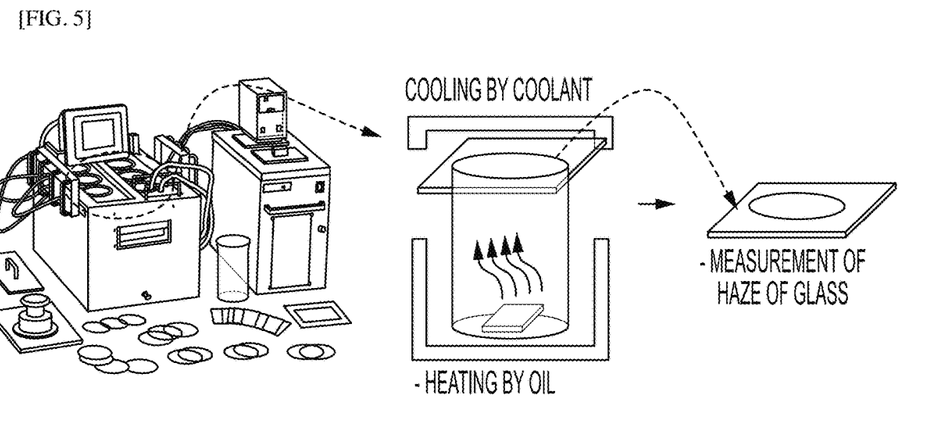
FIG. 5 includes an image and a drawing for explaining a method of evaluating the haze of a composition according to one embodiment of the present invention.

FIG. 5 includes an image and a drawing for explaining a method of evaluating the haze of a composition according to one embodiment of the present invention. Referring to FIG. 5, the composition specimens prepared in Examples, Additional Examples, and Comparative Example were placed in a container, and were heated using an oil bath and maintained at 130° C. for 5 hours. Thereafter, the haze (%) of a glass plate was measured using a haze meter.

Evaluation of Occurrence of Iridescence

Figure 6:
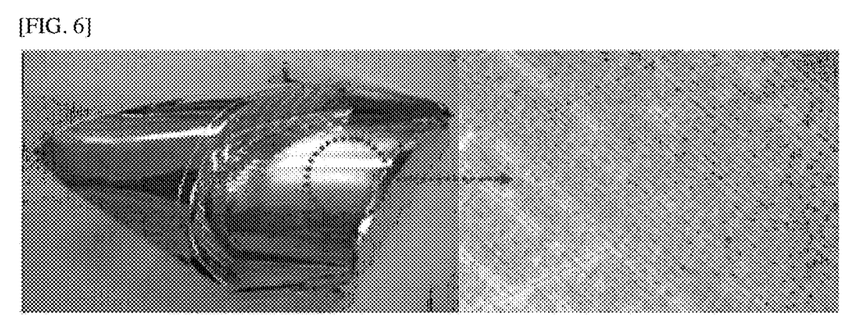
FIG. 6 includes images of a specimen in which iridescence occurs.

Specimens having a size of 10 mm×10 mm×3 mm were prepared using the compositions prepared in Examples, Additional Examples, and Comparative Example, and aluminum was deposited on the specimens using a thermal evaporation deposition machine. Then, the specimens were allowed to stand in a gear oven at 160° C. for 20 hours. Thereafter, the surface of each specimen was observed using a microscope to determine whether iridescence occurred. When iridescence was observed, it was marked with "0". When no iridescence was observed, it was marked with "X". FIG. 6 includes images of a specimen in which iridescence occurs.

Injection Stress (N): Evaluation of Releasability (Ejection Force, N)

For quantitative evaluation of the releasability of each sample, pressure delivered to a mold during injection was compared. A pressure sensor was attached to an ejection plate located on a moving side during injection, and pressure (ejection force, N) applied during injection release was expressed as numerical data. For precise comparison, releasability was measured at least 20 times and an arithmetic mean value was calculated.

TABLE 2

| | Examples | | | | | Additional Examples | | | | Comparative Example |
|---|---|---|---|---|---|---|---|---|---|---|
| Classification | 1 | 2 | 3 | 4 | 5 | 1 | 2 | 3 | 4 | 1 |
| Fluidity | 42 | 42 | 42 | 42 | 43 | 41 | 40 | 41 | 40 | 42 |
| Tensile strength (kgf/cm$^2$) | 590 | 590 | 590 | 590 | 600 | 580 | 580 | 580 | 580 | 580 |

TABLE 2-continued

| Classification | Examples | | | | | Additional Examples | | | | Comparative Example |
| --- | --- | --- | --- | --- | --- | --- | --- | --- | --- | --- |
| | 1 | 2 | 3 | 4 | 5 | 1 | 2 | 3 | 4 | 1 |
| Elongation (%) | 20 | 20 | 20 | 20 | 20 | 10 | 10 | 10 | 10 | 10 |
| Flexural strength (kgf/cm$^2$) | 910 | 910 | 910 | 910 | 910 | 910 | 910 | 910 | 910 | 910 |
| Flexural modulus (kgf/cm$^2$) | 26,100 | 26,100 | 26,100 | 26,100 | 27,000 | 26,1000 | 26,1000 | 26,1000 | 26,1000 | 26,100 |
| Whitening 130° C. | None | None | None | None | None | None | X | X | None | None |
| 160° C. | None | None | None | None | None | XX | XXX | XX | XXX | X |
| 200° C. | None | None | None | X | X | XXX | XXX | XXX | XXX | XX |
| 250° C. | | | | | | | | | | |
| Gas generation (mm2) 270° C. | 50 | 55 | 90 | 110 | 120 | 69 | 61 | 85 | 130 | 65 |
| Injection stress (N) | 3,200 | 3,000 | 2,350 | 2,200 | 1,980 | 2,800 | 2,180 | 2,500 | 2,500 | 2,500 |

FIG. 2 shows the results of a whitening test performed on the specimens of Examples 1 to 3 and Example 5, Additional Examples 2 to 4 according to the present invention, and Comparative Example 1. Referring to Table 2 and FIG. 2, it can be confirmed that the polyester-based resin composition according to one embodiment of the present invention has excellent mechanical properties and thermal stability.

More specifically, in the case of Examples 1 to 5 according to the present invention, compared to Comparative Example 1, little whitening was observed in a temperature range of 130° C. to 160° C. In particular, when comparing Example 2 and Comparative Example 1 in which other conditions except for the presence or absence of a polar group are the same, Example 2 exhibits whitening resistance, tensile strength, and thermal stability superior to those of Comparative Example 1.

In addition, when comparing Example 2 and Additional Examples 1 to 4 in which other conditions except for the dropping point and the crystallization temperature (Tm) of the polar group-containing lubricant are the same, Example 2 exhibits somewhat higher injection stress than Additional Examples 1 to 4. In addition, Example 2 exhibits superior whitening resistance to Additional Examples 1 to 4.

In addition, it can be seen that Examples 1 and 2 show the most suitable mechanical properties and fluidity for a headlamp bezel.

Example 6

Polybutylene terephthalate having an intrinsic viscosity of 1.12 dl/g, pentaerythritol tetrastearate as the ester group-containing lubricant, a phenolic antioxidant as the antioxidant, and a phenyl group-containing polycarbodiimide as the hydrolysis stabilizer were mixed to prepare a polyester-based resin composition.

In this case, based on 100 parts by weight of the polyester-based resin composition, the content of polybutylene terephthalate was 99.0 parts by weight, the content of the ester group-containing lubricant was 0.3 parts by weight, the content of the antioxidant was 0.2 parts by weight, and the content of the hydrolysis stabilizer was 0.5 parts by weight.

Example 7

A polyester-based resin composition was prepared in the same manner as in Example 6, except that polybutylene terephthalate having an intrinsic viscosity of 0.91 dl/g was used instead of the polybutylene terephthalate having an intrinsic viscosity of 1.12 dl/g and the contents of each of the polybutylene terephthalate, the ester group-containing lubricant, the antioxidant, and the hydrolysis stabilizer were adjusted as shown in Table 3 below.

Example 8

A polyester-based resin composition was prepared in the same manner as in Example 6, except that polybutylene terephthalate having an intrinsic viscosity of 1.00 dl/g was used instead of the polybutylene terephthalate having an intrinsic viscosity of 1.12 dl/g and the contents of each of the polybutylene terephthalate, the ester group-containing lubricant, the antioxidant, and the hydrolysis stabilizer were adjusted as shown in Table 3 below.

Additional Example 5

A polyester-based resin composition was prepared in the same manner as in Example 6, except that polybutylene terephthalate having an intrinsic viscosity of 0.83 dl/g was used instead of the polybutylene terephthalate having an intrinsic viscosity of 1.12 dl/g and the contents of each of the polybutylene terephthalate, the ester group-containing lubricant, the antioxidant, and the hydrolysis stabilizer were adjusted as shown in Table 3 below.

Additional Example 6

A polyester-based resin composition was prepared in the same manner as in Example 6, except that a mixture of polybutylene terephthalate having an intrinsic viscosity of 1.00 dl/g and polybutylene terephthalate having an intrinsic viscosity of 0.83 dl/g was used instead of the polybutylene terephthalate having an intrinsic viscosity of 1.12 dl/g and the contents of each of the polybutylene terephthalate, the ester group-containing lubricant, the antioxidant, and the hydrolysis stabilizer were adjusted as shown in Table 3 below.

Additional Example 7

A polyester-based resin composition was prepared in the same manner as in Example 6, except that a mixture of polybutylene terephthalate having an intrinsic viscosity of 1.00 dl/g and polybutylene terephthalate having an intrinsic viscosity of 0.83 dl/g was used instead of the polybutylene terephthalate having an intrinsic viscosity of 1.12 dl/g and the contents of each of the polybutylene terephthalate, the ester group-containing lubricant, the antioxidant, and the hydrolysis stabilizer were adjusted as shown in Table 3 below.

Additional Example 8

A polyester-based resin composition was prepared in the same manner as in Example 6, except that a mixture of polybutylene terephthalate having an intrinsic viscosity of 1.00 dl/g and polybutylene terephthalate having an intrinsic viscosity of 0.83 dl/g was used instead of the polybutylene terephthalate having an intrinsic viscosity of 1.12 dl/g and the contents of each of the polybutylene terephthalate, the ester group-containing lubricant, the antioxidant, and the hydrolysis stabilizer were adjusted as shown in Table 3 below.

represents the phenyl group-containing polycarbodiimide. In addition, in Table 3, the content of each component is given in parts by weight based on 100 parts by weight of the polyester-based resin composition.

The polyester-based resin compositions of Examples 6 to 8 and Additional Examples 5 to 8, which were formulated according to the components and contents shown in Table 3, were used to prepare specimens for measuring physical properties according to the above-described methods, and the physical properties of the specimens were measured according to the above-described methods for measuring physical properties. The results are shown in Table 4 below.

TABLE 4

| Classification | | Examples | | | Additional Examples | | | |
|---|---|---|---|---|---|---|---|---|
| | | 6 | 7 | 8 | 5 | 6 | 7 | 8 |
| Fluidity | | 13 | 43 | 32 | 75 | 55 | 43 | 38 |
| Tensile strength (kgf/cm$^2$) | | 590 | 580 | 580 | 580 | 580 | 580 | 580 |
| Elongation (%) | | 10 | 10 | 10 | 10 | 10 | 10 | 10 |
| Flexural strength (kgf/cm$^2$) | | 920 | 910 | 910 | 910 | 910 | 910 | 910 |
| Flexural modulus (kgf/cm$^2$) | | 27,000 | 26,100 | 27,000 | 26,800 | 26,100 | 26,100 | 27,100 |
| Viscosity | @ 250° C. | 520 | 240 | 398 | 186 | 161 | 202 | 212 |
| | @ 270° C. | 410 | 112 | 280 | 61 | 40 | 61 | 72 |
| Viscosity change rate (%) | | 55 | 64 | 62.5 | 59 | 60.5 | 70.5 | 70 |
| Fluidity evaluation | @ 60 bar (cm) | 18.2 | 24.5 | 25.0 | 29.8 | 24.6 | 25.5 | 25.0 |
| | @ 90 bar (cm) | 24.4 | 32.3 | 31.2 | 39.0 | 32.7 | 33.5 | 32.5 |
| | @ 120 bar (cm) | 31.2 | 38.8 | 36.5 | 47.3 | 38.3 | 38.5 | 38.0 |
| Maximum injection pressure (kgf/cm$^2$) | | 1,300 | 1,050 | 1,100 | 925 | 985 | 1,060 | 1,130 |
| Gas generation (mm$^2$) | 250° C. | 48 | 52 | 52 | 61 | 55 | 53 | 55 |
| | 270° C. | 57 | 62 | 64 | 83 | 74 | 69 | 66 |

TABLE 3

| Parts by weight | Examples | | | Additional Examples | | | |
|---|---|---|---|---|---|---|---|
| | 6 | 7 | 8 | 5 | 6 | 7 | 8 |
| A1 | 99.0 | | | | | | |
| A2 | | 99.0 | | | 40.0 | 59.0 | 79.0 |
| A3 | | | 99.0 | | | | |
| A4 | | | | 99.0 | 59.0 | 40.0 | 20.0 |
| B | 0.3 | 0.3 | 0.3 | 0.3 | 0.3 | 0.3 | 0.3 |
| C | 0.2 | 0.2 | 0.2 | 0.2 | 0.2 | 0.2 | 0.2 |
| D | 0.5 | 0.5 | 0.5 | 0.5 | 0.5 | 0.5 | 0.5 |

In Table 3, "A1" represents polybutylene terephthalate having an intrinsic viscosity of 1.12 dl/g, "A2" represents polybutylene terephthalate having an intrinsic viscosity of 1.00 dl/g, "A3" represents polybutylene terephthalate having an intrinsic viscosity of 0.91 dl/g, "A4" represents polybutylene terephthalate having an intrinsic viscosity of 0.83 dl/g, "B" represents pentaerythritol tetrastearate as the lubricant, "C" represents the phenolic antioxidant, and "D"

Referring to Table 4, it can be confirmed that the polyester-based resin composition according to one embodiment of the present invention has excellent mechanical properties and injection stability. More specifically, compared to Additional Examples 5 to 8 in which a polybutylene terephthalate resin having an intrinsic viscosity of less than 0.90 dl/g is included, in the case of Examples 6 to 8 in which a polybutylene terephthalate resin having an intrinsic viscosity of 0.90 to 1.15 dl/g is included, fluidity, mechanical properties, and injection stability are excellent, and the amount of gas generated during injection molding is reduced.

Example 9

52.5 parts by weight of a first polybutylene terephthalate resin having a relative viscosity of 1.0 according to ASTM D1243, 40.0 parts by weight of a second polybutylene terephthalate resin having a relative viscosity of 0.8 according to ASTM D1243, 5.0 parts by weight of a styrene-acrylonitrile copolymer containing 28% by weight of acrylonitrile, 0.5 parts by weight of a pentaerythritol-based lubricant, 0.2 parts by weight of a phenolic antioxidant (hindered phenolic primary antioxidant), and 0.5 parts by weight of an aromatic polycarbodiimide as the hydrolysis stabilizer were mixed to prepare a composition for automotive headlamp bezels.

Example 10

A composition for automotive headlamp bezels was prepared in the same manner as in Example 9, except that a styrene-acrylonitrile copolymer containing 29% by weight of acrylonitrile was used.

Example 11

A composition for automotive headlamp bezels was prepared in the same manner as in Example 9, except that 3.0 parts by weight of a styrene-acrylonitrile copolymer containing 29% by weight of acrylonitrile (prepared by two dehydration processes) was used.

Example 12

A composition for automotive headlamp bezels was prepared in the same manner as in Example 9, except that 1.0 part by weight of a styrene-acrylonitrile copolymer containing 29% by weight of acrylonitrile was used.

Additional Example 9

A composition for automotive headlamp bezels was prepared in the same manner as in Example 9, except that a styrene-acrylonitrile copolymer containing 24% by weight of acrylonitrile was used.

Additional Example 10

A composition for automotive headlamp bezels was prepared in the same manner as in Example 9, except that a styrene-acrylonitrile copolymer containing 32% by weight of acrylonitrile was used.

Additional Example 11

57.5 parts by weight of a first polybutylene terephthalate resin having a relative viscosity of 1.0 according to ASTM D1243, 40.0 parts by weight of a second polybutylene terephthalate resin having a relative viscosity of 0.8 according to ASTM D1243, 0.5 parts by weight of a pentaerythritol-based lubricant, 0.2 parts by weight of a phenolic antioxidant (hindered phenolic primary antioxidant), and 0.5 parts by weight of an aromatic polycarbodiimide as the hydrolysis stabilizer were mixed to prepare a composition for automotive headlamp bezels.

The components and contents included in the compositions of Examples 9 to 12 and Additional Examples 9 to 11 are shown in Table 5 below.

TABLE 5

| Parts by weight | Examples | | | | Additional Examples | | |
|---|---|---|---|---|---|---|---|
| | 9 | 10 | 11 | 12 | 9 | 10 | 11 |
| A1 | 52.5 | 52.5 | 54.5 | 56.5 | 52.5 | 52.5 | 57.5 |
| A2 | 40.0 | 40.0 | 40.0 | 40.0 | 40.0 | 40.0 | 40.0 |
| B1 | | | | | 5.0 | | |
| B2 | 5.0 | | | | | | |
| B3 | | 5.0 | 3.0 | 1.0 | | | |
| B4 | | | | | | 5.0 | |
| C | 0.9 | 0.9 | 0.9 | 0.9 | 0.9 | 0.9 | 0.9 |
| D | 0.6 | 0.6 | 0.6 | 0.6 | 0.6 | 0.6 | 0.6 |
| E | 1.0 | 1.0 | 1.0 | 1.0 | 1.0 | 1.0 | 1.0 |

In Table 5, "A1" represents a first polybutylene terephthalate resin having a relative viscosity of 1.0 according to ASTM D1243, "A2" represents a second polybutylene terephthalate resin having a relative viscosity of 0.8 according to ASTM D1243, "B1" represents a styrene-acrylonitrile copolymer containing 24% by weight of acrylonitrile, "B2" represents a styrene-acrylonitrile copolymer containing 28% by weight of acrylonitrile, "B3" represents a styrene-acrylonitrile copolymer containing 29% by weight of acrylonitrile, "B4" represents a styrene-acrylonitrile copolymer containing 32% by weight of acrylonitrile, "C" represents a pentaerythritol-based lubricant, "D" represents a phenolic antioxidant, and "E" represents an aromatic polycarbodiimide as the hydrolysis stabilizer.

Each of the polyester-based resin compositions of Examples 9 to 12 and Additional Examples 9 to 11 formulated according to the components and contents shown in Table 5 was used to prepare a specimen for measuring physical properties using the above-described methods. The physical properties of the specimen were measured using the above-described methods, and the results are shown in Table 6 below.

TABLE 6

| Classification | Examples | | | | Additional Examples | | |
|---|---|---|---|---|---|---|---|
| | 9 | 10 | 11 | 12 | 9 | 10 | 11 |
| Fluidity | 40 | 40 | 40 | 40 | 42 | 40 | 41 |
| Tensile strength (kgf/cm$^2$) | 550 | 550 | 550 | 550 | 550 | 550 | 550 |
| Elongation (%) | 10 | 10 | 10 | 10 | 10 | 10 | 10 |
| Flexural strength (kgf/cm$^2$) | 910 | 920 | 910 | 910 | 910 | 910 | 890 |
| Flexural modulus (kgf/cm$^2$) | 27100 | 27100 | 27000 | 27000 | 25200 | 27000 | 26500 |

TABLE 6-continued

| Classification | | Examples | | | | Additional Examples | | |
|---|---|---|---|---|---|---|---|---|
| | | 9 | 10 | 11 | 12 | 9 | 10 | 11 |
| Viscosity | @ 250° C. | 277 | 191 | 254 | 234 | 250 | 258 | 169 |
| | @ 270° C. | 161 | 151 | 134 | 144 | 153 | 173 | 123 |
| Viscosity change rate (%) | | 58 | 20 | 60 | 45 | 48.5 | 42.5 | 23 |
| Fluidity evaluation | @ 60 bar (cm) | 24.6 | 24.5 | 25.0 | 24.0 | 29.8 | 25.5 | 25.0 |
| | @ 90 bar (cm) | 32.7 | 32.3 | 32.5 | 30.5 | 39.0 | 33.5 | 31.2 |
| | @ 120 bar (cm) | 38.3 | 38.8 | 38.0 | 37.0 | 47.3 | 38.5 | 36.5 |
| Maximum injection pressure (kgf/cm$^2$) | | 985 | 1050 | 1130 | 1110 | 925 | 1060 | 1100 |
| Haze evaluation | | 4.8 | 4.3 | 4.1 | 3.3 | 23.0 | 15.0 | 2.1 |
| Gas generation (mm$^2$) | 250° C. | 72 | 58 | 56 | 54 | 80 | 63 | 52 |
| Occurrence of iridescence | | X | X | X | X | X | X | O |

Referring to Table 6, it can be confirmed that the composition for automotive headlamp bezels according to one embodiment of the present invention has excellent fluidity, mechanical properties, and injection stability, has a low haze value, and rarely exhibits iridescence, and thus can be suitably used in manufacture of an automotive headlamp bezel. More specifically, the compositions prepared according to Examples 9 to 12 have excellent fluidity, mechanical properties, and injection stability, have a haze value of less than 10, and do not exhibit iridescence, and thus can be suitably used in manufacture of an automotive headlamp bezel. In particular, in the case of Examples 10 to 12, since gas generation is reduced, contamination of a mold due to gas can be reduced. Thus, a mold cleaning cycle can be increased, thereby improving economic efficiency.

In addition, Examples 9 and 10 in which 5.0% by weight of a styrene-acrylonitrile copolymer containing 25 to 29% by weight of acrylonitrile is included have a lower haze value than Additional Example 9 in which 5.0% by weight of a styrene-acrylonitrile copolymer containing acrylonitrile in an amount less than the above range is included and Additional Example 10 in which 5.0% by weight of a styrene-acrylonitrile copolymer containing acrylonitrile in an amount exceeding the above range is included. Based on these results, it can be seen that Examples 1 and 2 are suitable for application to automotive headlamp bezels.

In addition, Additional Example 11 in which a styrene-acrylonitrile copolymer is not included exhibits the lowest haze value, but exhibits iridescence. Accordingly, it can be seen that Additional Example 11 is less suitable for application to automotive headlamp bezels compared to other Examples.

The invention claimed is:

1. A polyester-based resin composition, comprising:
   93 to 99.5% by weight of a polybutylene terephthalate resin;
   0.1 to 3% by weight of a polar group-containing lubricant; and
   0.1 to 2% by weight of an antioxidant,
   wherein the polar group-containing lubricant has a dropping point of 115 to 128° C.

2. The polyester-based resin composition according to claim 1, wherein the polybutylene terephthalate resin has an intrinsic viscosity of 0.90 to 1.15 dl/g.

3. The polyester-based resin composition according to claim 1,
   wherein the polybutylene terephthalate resin comprises a first polybutylene terephthalate resin having a relative viscosity of 0.95 to 1 as measured according to ASTM D1243 and a second polybutylene terephthalate resin having a relative viscosity of 0.75 to 0.8 as measured according to ASTM D1243.

4. The polyester-based resin composition according to claim 1, wherein the polar group-containing lubricant is a lubricant containing at least one polar group of a hydroxyl group, a carbonyl group, and an amino group.

5. The polyester-based resin composition according to claim 1, wherein the polar group-containing lubricant a crystallization temperature (Tm) of 102 to 122° C.

6. The polyester-based resin composition according to claim 1, wherein the antioxidant is a phenolic antioxidant.

7. The polyester-based resin composition according to claim 1, wherein the polyester-based resin composition further comprises a hydrolysis stabilizer.

8. The polyester-based resin composition according to claim 7, wherein the hydrolysis stabilizer is comprised in an amount of 0.01 to 2% by weight.

9. The polyester-based resin composition according to claim 7, wherein the hydrolysis stabilizer is an aromatic group-containing polycarbodiimide-based compound.

10. The polyester-based resin composition according to claim 1, wherein the polyester-based resin composition further comprises a styrene-acrylonitrile copolymer.

11. The polyester-based resin composition according to claim 10, wherein the styrene-acrylonitrile copolymer is comprised in an amount of 0.5 to 6% by weight.

12. The polyester-based resin composition according to claim 10, wherein the styrene-acrylonitrile copolymer comprises 71 to 75% by weight of styrene and 25 to 29% by weight of acrylonitrile.

13. The polyester-based resin composition according to claim 1, wherein the polyester-based resin composition has a haze value of 10 or less.

14. A molded article comprising an extruded or injected product of the polyester-based resin composition of claim 1.

15. The molded article according to claim 14, wherein the molded article is a bezel for automobile lamps.

16. The molded article according to claim 15, wherein the molded article has a haze value of 10 or less at 130 to 160° C.

17. A method of manufacturing an automotive headlamp bezel, comprising
- an injection step of injecting the polyester-based resin composition according to claim 1 to manufacture a molded article;
- a painting step of painting the manufactured molded article; and
- a deposition step of depositing aluminum on the painted molded article.

18. A polyester-based resin composition, comprising:
93 to 99.5% by weight of a polybutylene terephthalate resin;
0.1 to 3% by weight of a polar group-containing lubricant; and
0.1 to 2% by weight of an antioxidant, wherein the polybutylene terephthalate resin has an intrinsic viscosity of 0.90 to 1.05 dl/g.

19. A polyester-based resin composition, comprising:
93 to 99.5% by weight of a polybutylene terephthalate resin;
0.1 to 3% by weight of a polar group-containing lubricant; and
0.1 to 2% by weight of an antioxidant,
wherein the polyester-based resin composition further comprises a hydrolysis stabilizer and a styrene-acrylonitrile copolymer,
wherein the styrene-acrylonitrile copolymer comprises 71 to 72% by weight of styrene and 28 to 29% by weight of acrylonitrile, and
wherein the hydrolysis stabilizer is an aromatic group-containing polycarbodiimide-based compound.

\* \* \* \* \*